United States Patent
Hille

(10) Patent No.: US 7,385,771 B2
(45) Date of Patent: Jun. 10, 2008

(54) LIGHT FIXTURE LENS RETAINING DEVICE AND METHOD

(75) Inventor: Jonathan D. Hille, Tempe, AZ (US)

(73) Assignee: Atom Lighting, Inc., Tempe, AZ (US)

( * ) Notice: Subject to any disclaimer, the term of this patent is extended or adjusted under 35 U.S.C. 154(b) by 167 days.

(21) Appl. No.: 11/304,081

(22) Filed: Dec. 15, 2005

(65) Prior Publication Data

US 2006/0132934 A1 Jun. 22, 2006

Related U.S. Application Data

(60) Provisional application No. 60/593,198, filed on Dec. 20, 2004.

(51) Int. Cl.
*G02B 7/02* (2006.01)
(52) U.S. Cl. ..................... 359/811; 359/819
(58) Field of Classification Search ................ 359/811, 359/819–824; 368/372
See application file for complete search history.

(56) References Cited

U.S. PATENT DOCUMENTS

| 3,796,477 | A | * | 3/1974 | Geraci ..................... 359/511 |
| 4,590,545 | A | * | 5/1986 | Scheer ..................... 362/392 |
| 7,061,698 | B2 | * | 6/2006 | Osterried et al. ........... 359/819 |

* cited by examiner

*Primary Examiner*—Mohammed Hasan
(74) *Attorney, Agent, or Firm*—Snell & Wilmer LLP

(57) ABSTRACT

The present invention provides a retainer assembly and method for securely retaining a lens in a housing such as a light fixture bezel. An exemplary retainer assembly includes a lens and lens seal within a light bezel having threads and a contact surface formed on the bezel interior, a retaining ring having external features for engaging the threads on the bezel interior, and a contact ring disposed between the retaining ring and the lens to be secured in the bezel. An exemplary method involves the steps of placing a seal around the periphery and edge of a disc shaped lens, seating the lens within the lens bezel or retaining ring, and advancing the retaining ring within the bezel with a contact ring adjacent the lens and seal to prevent wear from rotation.

3 Claims, 5 Drawing Sheets

LIGHT FIXTURE LENS RETAINING DEVICE AND METHOD

REFERENCE TO RELATED APPLICATION

The present application claims the benefit of U.S. provisional application Ser. No. 60/593,198, filed Dec. 20, 2004.

FIELD OF INVENTION

The present invention pertains generally to lens retaining devices and methods and more particularly to devices and methods for removably securing and sealing lenses within a light fixture bezel.

BACKGROUND OF THE INVENTION

Outdoor lighting fixtures are typically subjected to rain, dirt, sprinklers, and general weathering by the elements. In addition, lighting fixture lenses mounted at or near ground level may be further subjected to impact, pressure, abrasion and possibly pooling of water. It is thus, important that lenses be durable, and that lenses be readily replaceable, since some lenses may inevitably fail under certain circumstance. For example, lighting fixtures mounted flush with the ground in an area of heavy foot or automobile traffic are more prone to lens damage.

Prior art lenses are typically glued, epoxied, or otherwise permanently mounted within a bezel. Glues and epoxies often fail as a result of the different thermal expansion properties of the bezel, lens, and glue or epoxy. Failure of such glues, breakage of a lens, or compromise of a lens seal typically calls for replacement of the costly bezel-lens combination or of the entire light. Lens bezels are typically ornamental and are, therefore, relatively expensive compared to the lens or seal components. Attempted reuse of a bezel with a broken glued-in lens is problematic, where the old lens and glue must be removed before adhesion of the replacement lens to ensure proper sealing and aesthetics.

The useable life of prior lighting systems is too often limited either functionally or financially by the limited durability of lenses that are not independently or easily replaceable. Accordingly, there is a need for a lens retaining and sealing device enabling convenient and inexpensive replacement of lenses and lens seals and that overcome other limitations of the prior art.

SUMMARY OF THE INVENTION

In general, various embodiments of the present invention provide a convenient means of retaining and replacing a lens housed within a lighting fixture. Various embodiments include a light fixture bezel for housing a lens and seal in cooperation with a removable lens retainer and contact ring for selective retention and removal of a lens within or from the bezel.

In one exemplary embodiment, the light bezel is configured to receive a lens and a seal between the lens and the bezel. According to an exemplary aspect of this embodiment, the bezel has threads formed on the bezel interior. In this case, a retaining ring having external features for engaging the threads formed on the bezel interior is advanced by rotational engagement of the external features with the threads of the bezel interior. Advancement of the retaining ring brings the ring into contact with the lens and/or seal, pressing the lens and/or seal into contact with the bezel. The seal may engage the periphery of one face of the lens, and may alternatively or additionally, engage the lens edge and/or the periphery of the second face of the lens. In an alternative embodiment, a contact ring is additionally or alternatively placed between the retaining ring and the lens and/or seal to prevent any wear or damage to the lens or seal from rotation of the retaining ring.

Various embodiments also provide for easy replacement of lenses, for example for replacement of a damaged lens or for variation of lens colors and lens effects. For example, lenses may be conveniently exchanged to create different holiday or event specific effects. Lenses may be configured to focus or diffuse light in any number of patterns or ways. A threaded retaining ring and bezel combination in accordance with embodiments of the invention is further advantageous in accommodating lenses of varying thickness or even multiple lenses. For example, a light mounted in a crosswalk may require a thicker lens to withstand the rigors of traffic and embodiments of the invention allow for securing lenses of various thicknesses within a particular bezel.

An exemplary method of retaining a lens according to the present invention includes disposing a seal around the periphery and edge of a lens; seating the seal and lens within one of a retaining ring and a light fixture bezel; disposing a contact ring between the lens and retaining ring; and advancing the retaining ring within the bezel to sealingly engage the seal with the lens and bezel.

The present invention avoids the waste and expense of replacing a bezel or an entire light because of a broken lens or seal. Interchangeability of independently replaceable lenses also provides greater flexibility of lens and lighting characteristics. Additional advantages of the present invention will be apparent from the detailed description.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures.

DETAILED DESCRIPTION

The following description is of exemplary embodiments of the invention only, and is not intended to limit the scope, applicability, or configuration of the invention in any way. While exemplary embodiments are described in sufficient detail to disclose the best mode and to enable those skilled in the art to practice the invention, it should be understood that other embodiments may be realized and that various mechanical changes may be made without departing from the scope of the invention as set forth herein. It should be appreciated that the description herein may likewise be adapted to be employed with alternatively configured devices having different shapes, components, and the like and still fall within the scope of the present invention. Thus, the detailed description herein is presented for purposes of illustration only and not of limitation.

According to various exemplary embodiments of the present invention, a lens and lens seal are independently replaceable within a light fixture. Independence of the seal and lens from the bezel and from each other provides a convenient, cost-effective alternative to replacing bezels or entire light fixtures because of failure of a lens or seal.

Figure 1:
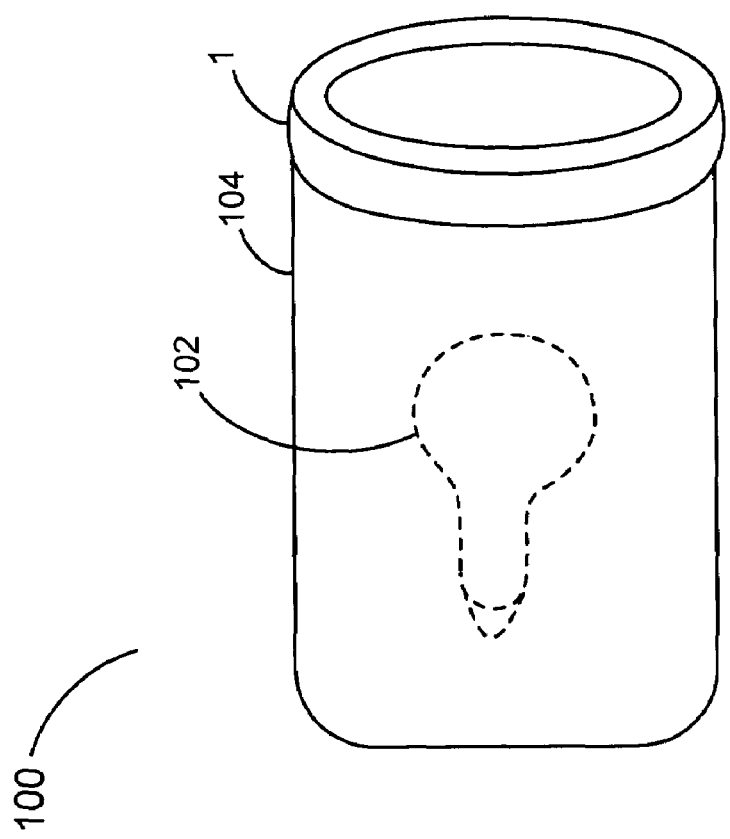
FIG. 1 illustrates an exemplary light fixture according to one embodiment of the invention.

With reference now to FIG. 1, an exemplary light fixture 100 includes, inter alia, a light source 102, a housing 104 around light source 102, and a lens retainer assembly 1 attached to housing 104 adjacent light source 102.

Figure 2:
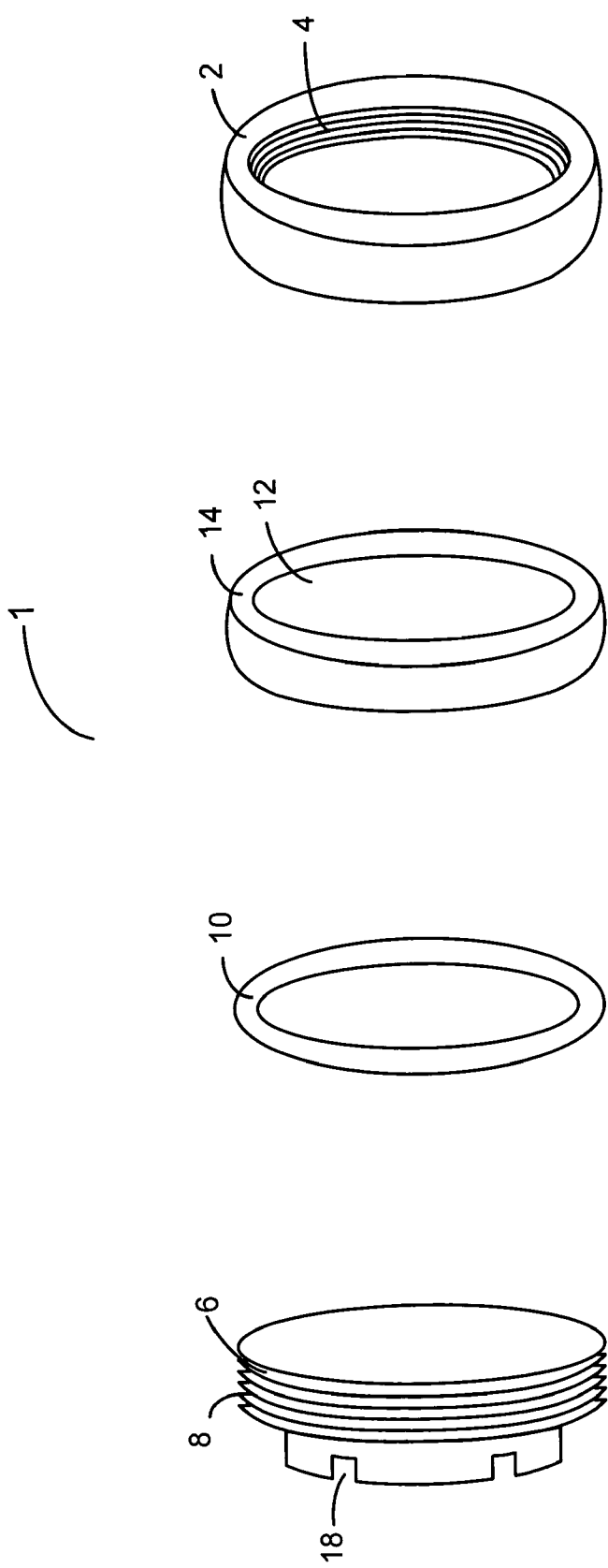
FIG. 2 illustrates an exploded view of various components of an exemplary lens retaining device according to one embodiment of the invention.

With reference now to FIG. 2, an exemplary lens retainer assembly 1 comprises a bezel 2 having threads 4 formed on the bezel interior, a retaining ring or simply retainer 6 including complimentary threads 8 or other external features to engage threads 4 on the bezel interior, and a contact ring 10 placed between retainer 6 and the lens 12 to be retained. Lens retainer assembly 1 may also include a seal 14 between lens 12 and bezel 2 or between any other assembly components. Retainer 6 is selectively movable between a withdrawn position and an advanced position relative to bezel 2.

Lens 12 is any transparent, semi-transparent, or semi-opaque component or material designed to transmit, focus, or diffuse light. The invention may employ a wide variety of lenses 12, including, flat, convex, concave, stacked, beveled, tiered, or any other configuration of lens. Lens 12 may be constructed of glass, plastic, or other suitable material.

Bezel 2 is any component designed to house a lens (whether the bezel is visible and ornate or whether it is obscured by other portions of the fixture case). An exemplary bezel 2 includes a cylindrical interior to receive lens 12 and a lens opening to be covered by lens 12 from within bezel 2. Bezel 2, the bezel interior, and the lens opening may be of any shape or dimension and may be formed from steel, aluminum, plastic, resin, or any other suitable material. Threads 4 or other engagement mechanism formed on the bezel interior may be formed along with bezel 2, e.g., during plastic injection processes. Alternatively, threads 4 may be cut into a formed bezel 2 in subsequent machining, e.g., a threading machine may cut threads 4 into a cast aluminum bezel 2.

Retainer 6 is any structure designed to attach lens 12 to or secure lens 12 within bezel 2. In various embodiments, retainer 6 and contact ring 10 are configured as continuous rings. While the term "ring" is used herein, it should be understood that retainer 6 or contact ring 10 may be of any shape, may be discontinuous, or may include multiple separate segments. Retainer 6 and contact ring 10 are preferably formed of a rigid material such as metal or plastic. Retainer 6 may be configured in any manner so as to secure lens 12 within bezel 2 upon advancement of the retainer 6 within bezel 2. Contact ring 10 may be configured in any manner so as to transfer the non-rotational forces generated by advancement of retainer 6 and to avoid stress concentrations in lens 12. Similarly, multiple contact rings 10 or spacers (not shown) may be used, for example, to position or center lens 12.

It will also be appreciated that threads 8 or other engagement mechanism may also be formed on the exterior of retainer 6 to be engaged by features on the bezel interior. Accordingly, complimentary threads 4 and 8 may be formed on the interior of bezel 2 and the exterior of retainer 6. Other interlocking mechanisms between bezel 2 and retainer 6 may be used in accordance with the present invention. For example, a deformable retaining ring or a split snap ring may be seated in an internal annular groove in the interior of bezel 2 to secure lens 12 in bezel 2. Similarly, an expansion spring may contact depressions or grooves along the interior of bezel 2.

Seal 14 is any component configured to sealingly engage lens 12 or bezel 2 so as to exclude moisture from lens retainer assembly 1. In accordance with various embodiments of the invention, seal 14 has an L-shaped cross-section such that seal 14 engages the lens edge and the periphery of at least one of the faces of lens 12. Seal 14 optionally includes at least one sealing ridge 20 for sealingly engaging with contact surface 16 of bezel 2 in the advanced position. Seal 14 may be formed of rubber, silicone, plastic, or any other suitable material and may include multiple segments or multiple layers.

Figure 3:
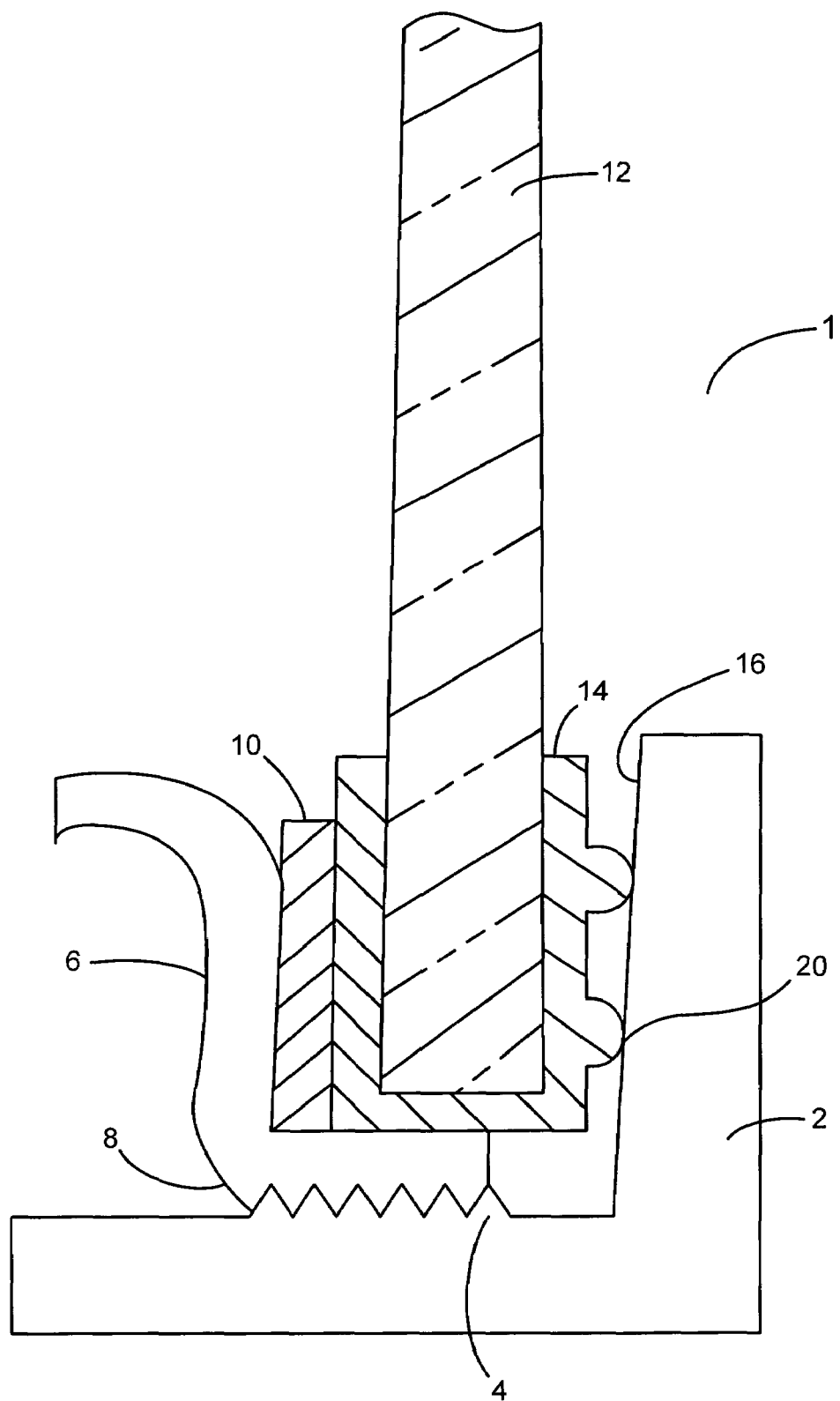
FIG. 3 illustrates an exemplary cross-sectional view of the assembled lens retaining device of FIG. 2.

In the advanced or assembled position shown in FIG. 3, retainer 6 is torqued to secure lens 12 within bezel 2 and to generate the contact force necessary between lens 12, seal 14, and bezel 2 to create a sealed lens retainer assembly 1. Bezel 2 includes a contact surface 16 such as an interior annular flange or shelf for providing mating engagement with lens 12 or with seal 14 interposed between contact surface 16 and lens 12. In the withdrawn position, retainer 6 is separable from bezel 2 to permit removal of lens 12, seal 14, and contact ring 10.

Figure 4:
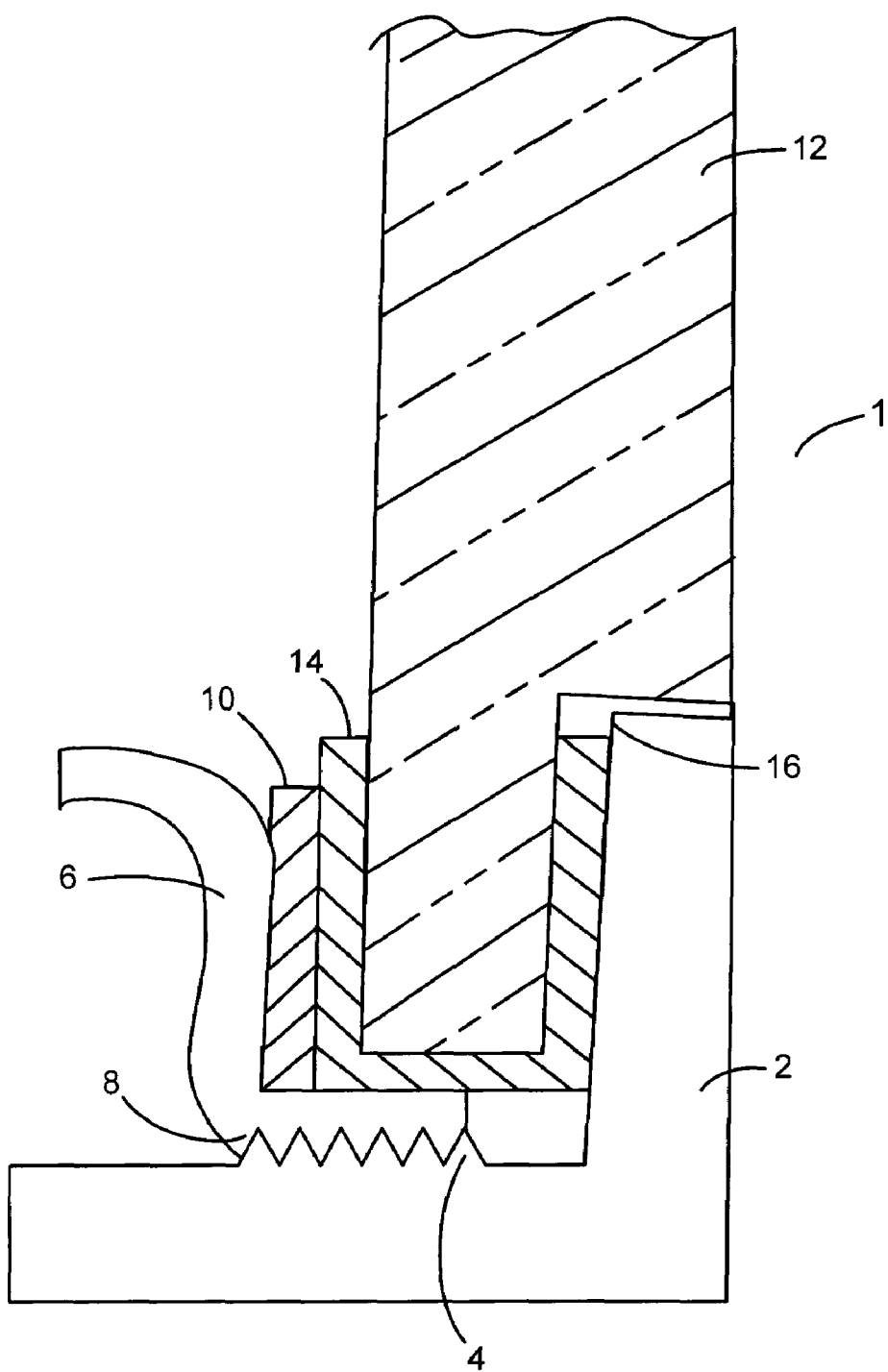
FIG. 4 illustrates a cross-sectional view of another assembled lens retaining device, having a tiered lens.

Lens 12 may be retained entirely behind contact surface 16 as illustrated in FIG. 3. Alternatively, as shown in FIG. 4, lens 12 may be tiered or beveled such that a central portion of lens 12 extends past contact surface 16. Accordingly, a portion of lens 12 may extend any distance through or beyond the lens opening in bezel 2. For example, lens 12 may be configured to be mounted partially recessed within bezel 2, flush with the external face of bezel 2, or protruding from the face of bezel 2. Similarly, in alternative embodiments, lens 12 may be curved such that a central portion of lens 12 extends past contact surface 16. With continued reference to FIG. 4, the entire forward face of seal 14 may engage contact surface 16, i.e., without the need for sealing ridge 20 as shown in FIG. 3.

In some applications and some embodiments, the seal created by contact of lens 12 directly with contact surface 16 may suffice. In other embodiments, one or more seals 14 may be necessary. For lights mounted flush with high traffic paths, supplemental seals or compressible shock absorber material may be disposed behind lens 12 to help absorb or diffuse impacts or forces applied to lens 12. For example, a rubber shock absorbing ring may be placed between lens 12 and contact ring 10. Alternatively, contact ring 10 may be. compressible or deformable to absorb some impact or shock to lens 12. Accordingly, seals may be used adjacent either face of lens 12. For example, a flat seal or o-ring style seal may be placed between lens 12 and bezel 2 or retainer 6.

With continued reference to the exemplary embodiments illustrated in FIGS. 3-4, resilient seal 14 is configured with a c-shaped cross-section to envelop the periphery of both of the faces as well as the edge of lens 12. By enveloping the edge and portions of both faces of lens 12 with seal 14, lens 12 is spared potentially damaging contact with bezel 2, contact ring 10, or retainer 6, or other damage during assembly or removal. Any type of seal 14 now known or later developed may be used in conjunction with the present invention.

Figure 5:
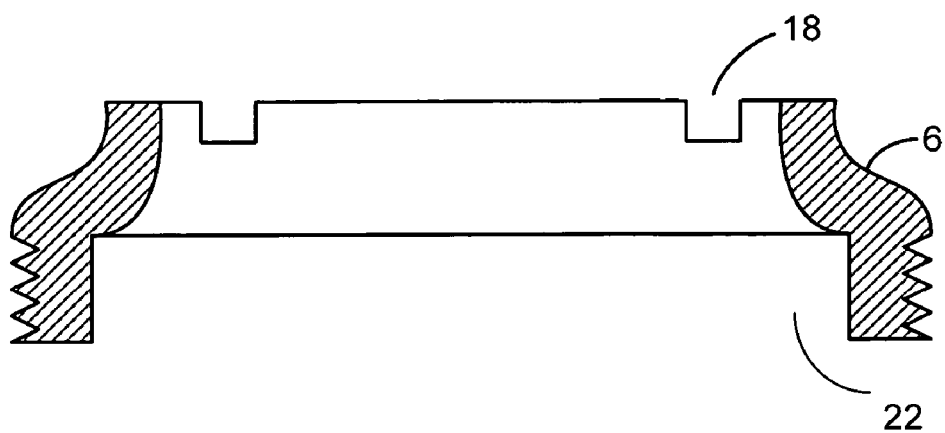
FIG. 5 illustrates a cross-sectional view of an exemplary retaining ring, having torque through-slots formed in a raised flange according to another embodiment.
Figure 6:
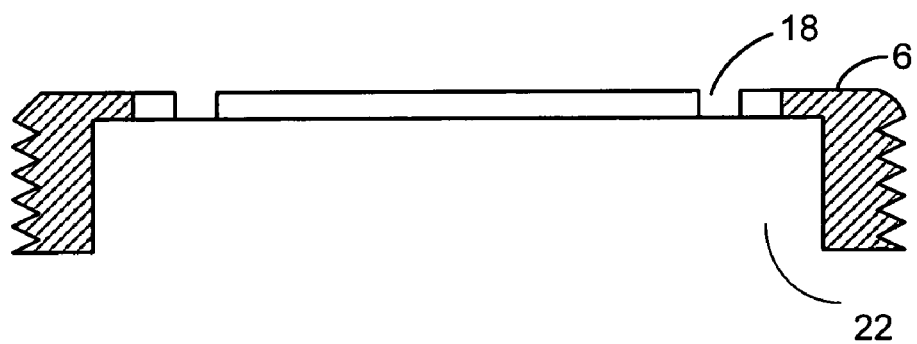
FIG. 6 illustrates a cross-sectional view of an exemplary retaining ring according to yet another embodiment having torque slots formed in a contact surface of the retaining ring.

With reference now to FIGS. 5-6, an exemplary retainer 6 is shown with a recess 22 for receiving lens 12. Recess 22 allows for ease of alignment of lens 12 within bezel 2 during assembly. Recess 22 may also retain seal 14 adjacent to lens 12. Exemplary retainer 6 includes features for imparting a rotational force or torque, such as annular torque slots 18 or tabs that protrude from the interior, exterior, or back of retainer 6 for manipulation by hand or by tools. Torque slots 18 are shown here. as through-slots formed in a flange protruding from the back of retainer 6.

With reference to the embodiment shown in FIG. 6, torque slots 18 may be formed as through-slots in recess 22 of retainer 6. In this embodiment, torque slot 18 is formed in the back wall or contact surface of recess 22 such that a tool inserted into torque slots 18 may slide along contact ring 10 during advancement or retraction of retainer 6 in bezel 2. In this case, contact ring 10 may serve to protect lens 12 and seal 14 from a tool used during manipulation of retainer 6. It will be appreciated that any number of torque features such as tabs, recesses, slots, posts, or the like may be configured to enable manipulation of retainer 6 within bezel 2.

A method of arranging the lens retainer assembly components according to one embodiment of the present invention involves the steps of placing seal 14 around the periphery and edge of a disc-shaped lens 12, seating lens 12 within bezel 2, and advancing a retainer 6 within bezel 2 with contact ring 10 adjacent lens 12 and/or seal 14 to prevent lens or seal wear by retainer 6. For example, lens 12 and/or seal 14 may be seated initially in retainer 6 or bezel 2 depending on the desired mode of assembly and use.

Seal 14 may be deformable so as to be stretched over the edges of lens 12. This seal configuration protects lens 12 during assembly in addition to providing multiple sealing surfaces. Alternatively, seal 14 may be glued in place on or otherwise fixedly attached to lens 12 or bezel 2 or may simply float between lens 12 and contact surface 16 of bezel 2.

In various embodiments, seal 14 is compressed between the sides of recess 22 and lens 12 during assembly so as to frictionally secure lens 12 within recess 22 of retainer 6. For example, seal 14 is stretched over the edge and periphery of disc-shaped lens 12, the lens/seal combination being interference fitted into recess 22 in retainer 6. This particular embodiment allows for insertion and removal of a single lens/seal/retainer assembly, reducing the chances of misalignment, damage, or loss of components during assembly. This configuration also provides a seal between lens 12 and retainer 6 to further exclude moisture from the assembly.

Finally, while the present invention has been described above with reference to various exemplary embodiments, many changes, combinations and modifications may be made to the exemplary embodiments without departing from the scope of the present invention. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present invention.

What is claimed is:

1. A lens retaining device comprising:
a light fixture bezel having threads and a contact surface formed on an interior portion thereof;
a lens adjacent said contact surface;
a seal disposed between said contact surface and said lens, wherein said seal engages the periphery of one face and the edge of said lens;
a retaining ring comprising a recess for receiving said lens and further comprising thread-engaging features formed on the exterior thereof for advancement of said retaining ring within said bezel, wherein said seal is compressible between the edge of said lens and said recess so as to frictionally retain said lens within said recess;
and a contact ring disposed between said lens and said retaining ring.

2. A lens retaining device comprising:
a light fixture bezel having a contact surface formed on the interior thereof;
a lens removeably disposed adjacent said contact surface;
an annular seal disposed between said lens and said contact surface, wherein said seal engages the edge of said lens; and
a retaining ring configured to engage said bezel and to retain said lens adjacent said contact surface, wherein said seal is compressible between said edge of said lens and said retaining ring to secure said lens to said retaining ring.

3. A lens retaining device comprising:
a light fixture bezel having a contact surface formed on the interior thereof;
a lens removeably disposed adjacent said contact surface;
an annular seal disposed between said lens and said contact surface; and
a retaining ring configured to engage said bezel and to retain said lens adjacent said contact surface, wherein said retaining ring is moveably engageable within said bezel to accommodate variation of at least one of the number of lenses and the thickness of at least one of said lens and said seal.

* * * * *